(12) United States Patent
Beeler et al.

(10) Patent No.: US 7,576,634 B2
(45) Date of Patent: *Aug. 18, 2009

(54) SYSTEM AND METHOD FOR MONITORING CONGESTION PAGING

(75) Inventors: John Beeler, Atlanta, GA (US); Kevin King, Acworth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/128,466

(22) Filed: May 13, 2005

(65) Prior Publication Data

US 2005/0208955 A1    Sep. 22, 2005

(51) Int. Cl.
*H04L 12/66* (2006.01)
(52) U.S. Cl. ........................ 340/7.2; 455/458
(58) Field of Classification Search ............... 370/352, 370/332, 333; 455/453, 434, 423, 458, 422; 340/505, 7.58, 7.2, 825, 7.1; 379/88.11
See application file for complete search history.

(56) References Cited

U.S. PATENT DOCUMENTS

| | | | | |
|---|---|---|---|---|
| 4,017,831 | A * | 4/1977 | Tieden et al. | 340/505 |
| 4,799,253 | A * | 1/1989 | Stern et al. | 455/453 |
| 4,887,265 | A * | 12/1989 | Felix | 370/333 |
| 5,457,680 | A * | 10/1995 | Kamm et al. | 370/332 |
| 5,878,326 | A * | 3/1999 | Benz et al. | 340/7.58 |
| 6,128,506 | A * | 10/2000 | Knutsson et al. | 455/453 |
| 6,178,235 | B1 * | 1/2001 | Petersen et al. | 370/237 |
| 6,490,248 | B1 * | 12/2002 | Shimojo | 370/395.42 |
| 6,832,086 | B1 * | 12/2004 | Powers et al. | 455/423 |
| 6,888,927 | B1 * | 5/2005 | Cruickshank et al. | 379/88.11 |
| 2002/0077111 | A1 * | 6/2002 | Spaling et al. | 455/453 |

* cited by examiner

*Primary Examiner*—Brian A Zimmerman
*Assistant Examiner*—Nabil H Syed

(57) ABSTRACT

Systems and methods for monitoring a paging signal from a mobile switch to a cellular transmitter for occurrences of congestion. The system includes a switch; a cell site in communication with the switch, for broadcasting a page received from the switch to a cellular device configured to receive the page; and a monitoring module in communication with the switch for monitoring occurrences of paging congestion between the switch and the cell site.

13 Claims, 1 Drawing Sheet

SYSTEM AND METHOD FOR MONITORING CONGESTION PAGING

BACKGROUND OF THE INVENTION

1. Field of Invention

The present invention relates generally to mobile communications and, more particularly, to a system and method for monitoring paging signals transmitted from a mobile switch to a cell site for occurrences of congestion.

2. Description of the Background

As mobile telephones have grown from mere voice communications devices to sophisticated appliances for paging, text functions and Internet access, bandwidth management has become a critical function for providing Quality of Service (QoS). A wireless communications network typically includes a mobile switch, a paging area, and a cellular device such as a cellular telephone. The mobile switch manages traffic between cellular users. The paging area includes a plurality of cellular telephone transmitters, or cell sites, that cover a certain geographical area. In operation, the mobile switch directs a page, addressed to a certain cellular device, to the appropriate paging area. A cell site, within the paging area, then broadcasts the page, causing, for example, a cellular phone to ring. In practice, network congestion occurs between the mobile switch and a cell site, due in part to limited bandwidth between the switch and the cell site. Such congestion may cause pages sent from the switch to a targeted cellular device, via the cell site, to be lost. Lost pages cause users of cellular devices, such as cellular phones, to miss calls because the phone fails to ring. Paging congestion, therefore, significantly affects QoS. Additionally, paging congestion can lead to substantial revenue losses for telecommunications service providers that fail to collect for unconnected calls.

A mobile switch may communicate with a cell site over a T-1 line. A T-1 line is a commonly used digital line that bundles 24 channels called DS0s, where each DS0 is capable of transmitting 64 kbps, for an overall transmission rate of 1.5 Mbps. Some wireless communication networks, however, may limit paging communications to just one of the 24 channels in a T-1 line, reserving the other 23 channels for transmitting voice data. The growing popularity of cellular phones has caused the DS0 channel dedicated to paging to operate at or beyond its 64 kbps capacity. New services, such as short messaging service and message waiting indicators on cellular phones, also share the same DS0.

A network diagnostic tool is needed that enables service providers to identify, and even quantify, instances of paging congestion. Such a system needs to provide sufficient flexibility to identify paging congestion problems that exceed certain quantitative thresholds. Such a system also needs to provide a notification system in which certain network operators receive timely alerts when a paging congestion problem occurs. The present invention satisfies this need.

SUMMARY OF THE INVENTION

The present invention is directed to systems and methods for monitoring a paging signal from a mobile switch to a cellular transmitter for occurrences of congestion. According to one embodiment, the system comprises a switch; a cell site in communication with the switch, for broadcasting a page received from the switch to a cellular device configured to receive the page; and a monitoring module in communication with the switch for monitoring occurrences of paging congestion between the switch and the cell site.

The present invention may be used, for example, to monitor pages transmitted from the mobile switch but not received by the cell site. In the case of a cellular phone, pages transmitted from the mobile switch cause the receiving cellular phone to ring. Lost pages, however, cause customers to miss calls. The present invention may be used, for example, as a statistical tool for identifying operational problems that might otherwise go unnoticed. In addition to statistical benefits, the present invention may also be used to notify network operators of paging congestions problems. Finally, the present invention may also be used as a loss of revenue indicator by quantifying the number of lost pages that resulted in, for example, unconnected calls.

These and other benefits of the present invention will be apparent from the detailed description below.

DESCRIPTION OF THE FIGURES

For the present invention to be understood clearly and readily practiced, the present invention will be described in conjunction with the following FIGURE, wherein.

DETAILED DESCRIPTION OF THE INVENTION

Figure 1:
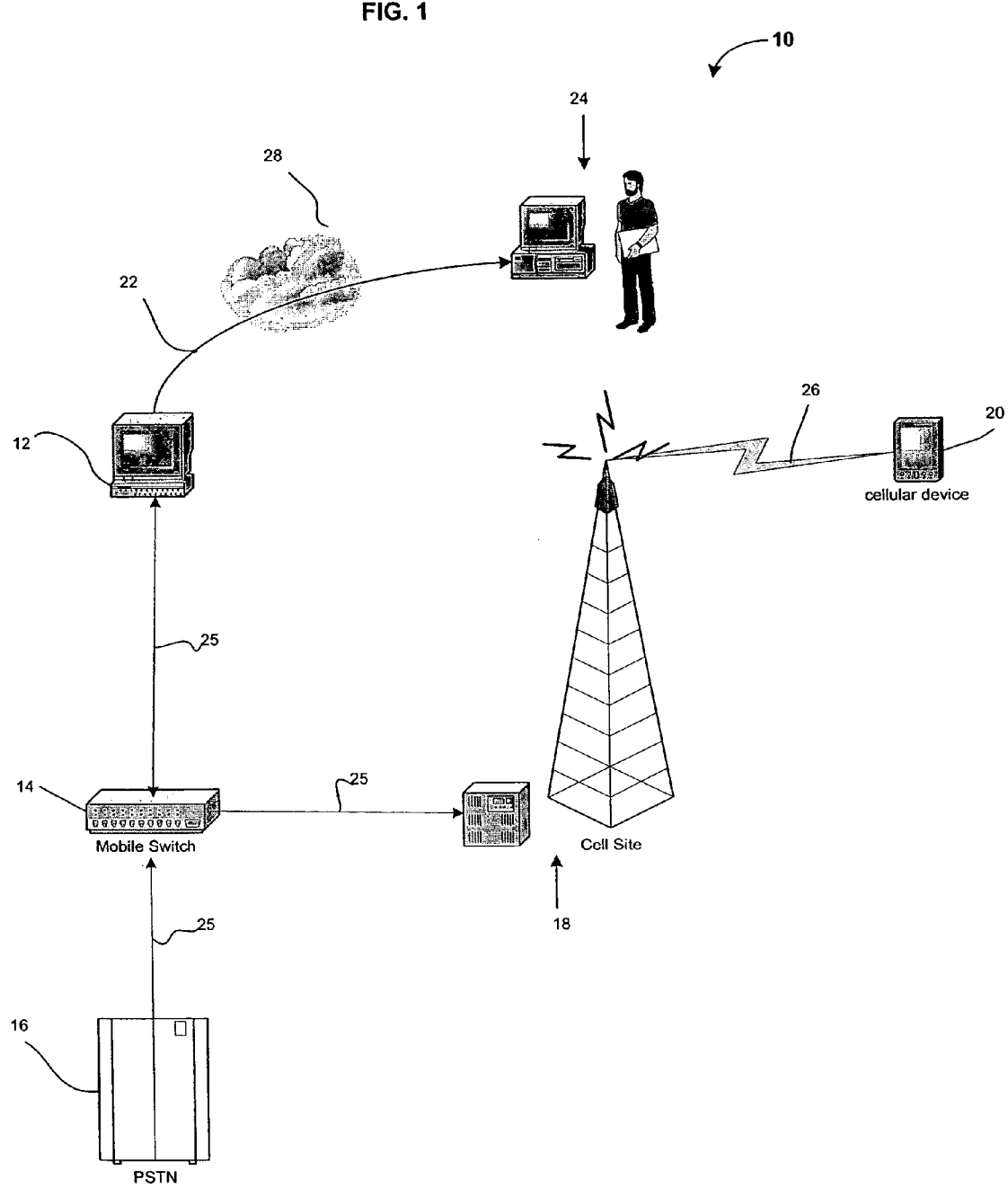
FIG. 1 is a block diagram of a cellular communications system according to one embodiment of the present invention.

It is to be understood that the figures and descriptions of the present invention have been simplified to illustrate elements that are relevant for a clear understanding of the present invention while eliminating, for purposes of clarity, other elements. For example, certain system details and modules of certain intelligent platforms are not described herein. Those of ordinary skill in the art will recognize, however, that these and other elements may be desirable in a typical network. A discussion of such elements is not provided because such elements are well known in the art and because they do not facilitate a better understanding of the present invention.

FIG. 1 is a block diagram of a cellular communications system 10 according to one embodiment of the present invention for monitoring paging congestion between a mobile switch and a cell site. The system 10 includes a page-monitoring module 12, a mobile switch 14, a public switched telephone network (PSTN) 16, a cell site 18, and a cellular device 20. The monitoring module 12, as described further hereinbelow, receives reports of missed pages from the mobile switch 14 and outputs a notification 22 to network operators 24, such as by email or page, when the number of missed pages due to paging congestion exceeds a predetermined amount. The mobile switch 14 is the bridge between the PSTN 16 and the cell site 18 that ultimately makes the wireless connection to the user's cellular device 20.

The monitoring module 12, which communicates with the paging queue of mobile switch 14, may be implemented on an intelligent platform such as, for example, a computer, such as a workstation or a personal computer, a microprocessor, a network server, or an application specific integrated circuit, using any suitable type of computer instruction. Module 12 may also be implemented as software code to be executed by the system 10 using any suitable computer language such as, for example, microcode, and may be stored in, for example, an electrically erasable programmable read only memory (EEPROM), or can be configured into the logic of the system 10. According to another embodiment, module 12 may be implemented as software code to be executed by the system 10 using any suitable computer language such as, for example, Java, Perl, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as CD-ROM. According to one embodiment, module 12 may be integrated with the hardware or software of the mobile switch 14.

According to one embodiment, the switch 14 may be in communication with the module 12, the PSTN 16, and the cell site 18 via a communications network 25 including, individually or in combination, a wireline network or wireless network. The communications network may include, for example, individually or in combination, a plain old telephone system (POTS), a public switched telephone network (PSTN), a wireless telephone network, the Internet, an intranet, a LAN, or a WAN, using, for example, packet-switching or circuit switching transmission modes. According to another embodiment, the mobile switch 14 may be part of a mobile switching center (MSC) in communication with the module 12 and the cell site 18.

According to one embodiment, the monitoring module 12 is configured to count the number of occurrences of paging congestion between the mobile switch 14 and the cell site 18. An occurrence of paging congestion refers to an instance where, for example, a cellular phone customer did not receive notification of an incoming call. For example, when the mobile switch 14 receives an incoming call directed to the cellular device 20, the mobile switch 14 issues a page 26 to the cellular device 20 via the cell site 18. Normally, when the cellular device 20 receives the page 26, the cellular device 20 rings, notifying the cellular subscriber of an incoming call. During instances of paging congestion between the mobile switch 14 and the cell site 18, however, the page 26 may be lost. According to such an embodiment, module 12 may count the lost pages over a predetermined time interval.

According to another embodiment, module 12 may use the lost page information to perform some corrective action. For example, module 12 may notify network operators 24 when the number of lost pages reaches a predetermined limit, such as 100 lost pages in one hour. According to such an embodiment, module 12 may issue notification 22 to the network operators 24, such as by electronic mail or by page, via, for example, a wide area network (WAN) 28. The notification 22 may include, for example, the number of pages lost over some time interval. Notifications may also include information to facilitate troubleshooting, such as the location of paging congestion. The location may be designated by, for example, paging area.

It should be understood that the invention is not limited by the foregoing description of preferred embodiments, but embraces all such alterations, modifications, and variations in accordance with the spirit and scope of the appended claims.

What is claimed is:

1. An apparatus for monitoring paging congestion, comprising:
a first interface to a mobile switch that transmits paging messages to be communicated through a cell site from a public switched telephone network in communication with the mobile switch, the mobile switch providing a bridge between a public switched telephone network and the cell site; and
a monitoring module in communication with a paging queue of the mobile switch via a second interface, the monitoring module determining congestion in the transmission of the paging messages between the mobile switch and the cell site by counting a number of paging messages that the mobile switch is unable to transmit to the cell site via the first interface.

2. The apparatus of claim 1, wherein the paging message is adapted to alert the cell phone to ring for an incoming call.

3. The apparatus of claim 2, wherein the incoming call is a voice communication.

4. The apparatus of claim 1, wherein the apparatus communicates a notification responsive to the number of messages that the mobile switch is unable to transmit to the cell site within a predetermined limit.

5. The apparatus of claim 4, wherein the predetermined limit is evaluated per a unit of time.

6. The apparatus of claim 4, wherein the notification is at least one of an electronic mail message and a page.

7. A computer-readable medium comprising computer-readable instructions which, when executed on a computer, will cause the computer to:
receive data from a paging queue of a bridging device over a second interface concerning messages to be communicated to a cell site over a first interface from the bridging device which is in communication between the cell site and a public switched telephone network, the messages comprising information that is broadcast by the cell site to page a cell phone; and
determine congestion in the transmission of the paging messages between the cell site and the bridging device by counting a number of paging messages that a cell site is unable to receive via the first interface of the bridging device.

8. The computer-readable medium of claim 7, wherein a paging message is a page adapted to alert the cell phone to ring for an incoming call.

9. The computer-readable medium of claim 8, wherein the incoming call is a voice communication.

10. The computer-readable medium of claim 7, further comprising communicating a notification responsive to the number of paging messages that the bridging device is unable to transmit to the cell site within a predetermined limit.

11. The computer-readable medium of claim 10, wherein the predetermined limit is evaluated per a unit of time.

12. The computer-readable medium claim 10, wherein communicating the notification comprises communicating at least one of an electronic mail message and a page.

13. The apparatus of claim 1, wherein the monitoring module is located outside of the cell site.

\* \* \* \* \*